United States Patent
Schuster

[15] 3,691,518
[45] Sept. 12, 1972

[54] METHODS AND APPARATUS FOR ACOUSTIC TRAVEL TIME AND CEMENT BOND LOGGING

[72] Inventor: Nick A. Schuster, Darien, Conn.
[73] Assignee: Schlumberger Technology Corporation, New York, N.Y.
[22] Filed: April 7, 1970
[21] Appl. No.: 26,265

[52] U.S. Cl. ............... 340/.18 P, 181/.50 S, 181/.5 P, 340/15.5 TI
[51] Int. Cl. ............................................... G01v 1/16
[58] Field of Search ..... 340/15.5 TI, 1 P, 1 OS, 1 AC, 340/1 BO, 18 R, 18 P; 181/15 OS, 15 P

[56] References Cited

UNITED STATES PATENTS

| | | | |
|---|---|---|---|
| 3,376,950 | 4/1968 | Grine | 340/18 |
| 3,526,874 | 9/1970 | Schwartz | 340/18 R |
| 3,475,722 | 10/1969 | White | 240/15.5 |
| 3,302,166 | 1/1967 | Zemanell, Jr. | 340/15.5 TI |
| 3,148,352 | 9/1964 | Summers | 340/18 |
| 3,424,268 | 1/1969 | Vogel | 340/18 |
| 3,302,166 | 1/1967 | Zemanak, Jr. | 340/18 |
| 3,304,537 | 2/1967 | Schwartz | 340/18 |

Primary Examiner—Benjamin A. Borchelt
Assistant Examiner—N. Moskowitz
Attorney—Ernest R. Archambeau, Jr., Donald H. Fidler, David L. Moseley, Edward M. Roney and William R. Sherman

[57] ABSTRACT

An illustrative embodiment of the present invention includes an acoustic well logging sonde having four articulated arm members disposed at quadrant intervals about a central tubular body member and having an acoustic transmitting transducer disposed on the lower portion of the body member. A total of six acoustic transducers are carried by the four quadrant spaced arms of the tool. A switching arrangement is provided for selecting groups of four of the six articulated transducers for making either cement bond log measurements or acoustic travel time measurements.

17 Claims, 2 Drawing Figures

PATENTED SEP 12 1972 3,691,518

Nick A. Schuster
INVENTOR

BY William J. Beard
ATTORNEY

3,691,518

METHODS AND APPARATUS FOR ACOUSTIC TRAVEL TIME AND CEMENT BOND LOGGING

BACKGROUND OF THE INVENTION

This invention relates to well logging methods and tools and more particularly to methods for acoustic well logging using tools of the type designed to make acoustic travel time measurements and cement bond measurements.

It is well-known in the art of acoustic logging that the velocity of an acoustic impulse through an earth formation or, conversely, its travel time through a given distance in the formation is indicative of the character of the formation and its constituent materials. In particular, this information is useful in determining the porosity of well formations which, in turn, leads to an indication of the capability of such a formation for producing oil from the pores located therein. Generally, apparatus for making acoustic logs comprises a sonde which is adapted to be passed through the well bore and surface equipment for interpreting and recording electrical signals received at the surface from the logging tool, together with an interconnecting cable which serves to both conduct electrical signals and power from the surface to the tool and also, to transmit signals from the tool to the surface while supporting the tool during its passage through the well bore.

Known prior art acoustic travel time logging tools have contained for example, a plurality of acoustic transmitters and a plurality of acoustic receivers located between the transmitters and along the central tubular body of the tool. Appropriate electronic equipment has been located in the tool housing to actuate the transmitters and generate the acoustic impulses which are transmitted through the borehole fluid and into the surrounding formations. The acoustic receivers carried on the tool are selectively responsive to acoustic energy transmitted through the formation and the intervening borehole fluid to provide an electrical indication representative of the acoustical energy arriving at the receivers. These electrical signals may be representative of both the transmitted impulses and the received impulses and may be interpreted by electronic equipment within the tool itself or at the surface of the earth to provide acoustic velocity or travel time indications. These indications are then generally recorded as a function of depth in the well bore to provide a travel time log which is indicative of the porosity of the formations surrounding the well bore.

Similarly, in the past, it has been the practice to provide a means for evaluating the condition of cement behind the casing in a cased well bore through the use of an acoustic logging device. In this application, an acoustic logging tool having at least one transmitter and one receiver spaced longitudinally along the tool housing therefrom, is suspended in the well bore by an electrical cable which serves to both support the tool and conduct operational signals to the tool from the surface and resulting acoustical signals received by the tool from the casing and cement to the surface. For this purpose the acoustic transmitter is activated and generates an acoustic impulse which travels through the borehole fluid and along the casing, back through the borehole fluid, and thence to the acoustical receiver which is located a space distance from the transmitter. The amplitude of the received signal is then utilized to determine the condition of bonding between the cement and the casing surrounding the well bore. If the casing and cement are well bonded to each other, it has been observed that the acoustical energy transmitted into the casing can escape from the casing into the cement and surrounding formations because of the good mechanical coupling between the bonded cement and the casing. On the other hand, if the cement and casing are not well bonded, most of the acoustical energy transmitted will travel longitudinally along the casing and be picked up at the receiver of the logging sonde. Thus, if a low amplitude acoustic signal is received it can be inferred that the casing between the transmitter and the receiver is relatively well bonded to the cement surrounding the casing and if the amplitude of the signal reaching the receiver is high, it can be inferred that such a good cement bond does not exist.

It should be noted in both types of acoustic logging discussed above, that the energy from the acoustic transmitter in the logging tool must pass through the borehole fluids surrounding the tool into the casing or formations surrounding the tool, travel longitudinally in the formation or casing parallel to the borehole, and then again pass through the fluid surrounding the tool to reach the receiver. If the well logging tool is tilted or eccentric in the borehole then it is apparent that in the case of a multiple receiver sonde, the signal reaching the receivers can travel through different thicknesses of the borehole fluid in traversing the multiple paths to the receiver. In the case of acoustic travel time logging, this is critical since it can introduce an error into the travel time measurement made between the transmitter and the receiver due to the fact that the velocity of propagation of acoustic waves is much different in the borehole fluid than it is in the casing or surrounding formation. In the past various techniques for overcoming this difficulty (known as borehole compensating in) the acoustic travel time measurements have been employed. Among these are the technique of using a multiplicity of transmitter and receivers and making a plurality of measurements of acoustic travel times between differing pairs of acoustic transmitters and receivers. The different measurements may then be combined in such a manner as to eliminate or compensate for the possibility that the sonde is eccentric by having the borehole path lengths taken by each of the measurements cancel in the combination of measurements. This, of course, leads to complications in the electronic circuitry required to operate the tool. It would be highly desirable to provide a simpler and more reliable manner in which these measurements could be made while compensating for the differing acoustic path lengths of the acoustic waves between the transmitter and the receivers.

Moreover, in the case of cement bond logging as discussed above, the cement condition may not be truly indicated by the amplitude measurement discussed if there exist cement channels or unsymmetrical distribution of a good cement bond about the exterior of the casing. For example, it may be possible that the cement is bonded to the casing nearly all the way about its circumference but a channel or open space with no cement could be present on one side of the casing. In such a case a cement bond log made as indicated above might possibly indicate that the cement condition surrounding the casing was good, while in fact, the existence of the channel on one side of the casing could permit fluid communication along the borehole between adjacent porous formations. This of course, is a highly undesirable feature in a completed well as it permits contamination of one formation by fluids from another formation. It is this type of fluid communication which is the object of the cement bond log to hopefully detect by determining the absence of a good cement bond or the absence of cement between the casing and the formations. Thus, it would be highly desirable to provide an acoustic logging tool which could indicate the presence of such cement channels along an apparently well bonded section of casing.

Accordingly, it is an object of this invention to provide an acoustic well logging tool which may be used for acoustic travel time measurements and which is relatively unaffected by the centering of the tool in the borehole.

Another object of the invention is to provide an acoustic logging tool which may be used for cement bond logging and which can indicate cement channels in portions of a well having otherwise well bonded cement.

Yet another object of the present invention is to provide an acoustic well logging tool which may be utilized in either open or cased boreholes to provide either acoustic travel time measurements or cement bond measurements and capable of detecting cement channels.

Briefly, in accordance with the objects of the present invention an acoustic well logging tool is provided in which a central tubular body member carries the downhole electronic circuitry necessary to operate the tool and disposed at the lower end thereof is a single acoustic transmitter. Symmetrically arranged about the central tubular body member of the tool are four foldable arms which can be extended outwardly to engage the wall of the well bore in an open hole or the interior surface of the casing of a cased hole. Two of the outwardly extending arms which are diametrically disposed from each other contain a pair of longitudinally displaced acoustic receiving transducers. The remaining two arms which are diametrically disposed about the central tubular body member each contain one acoustic receiving transducer. When the tool is utilized for acoustic travel time logging, the two arms which contain pairs of acoustic receiving transducers disposed longitudinally from each other are utilized, thus providing a single transmitter and four acoustic receiver logging systems.

When it is desired to use the tool for cement bond logging, a switching arrangement is provided for utilizing one acoustic logging transducer in each of the four symmetrically disposed arms. Thus, four transducers are provided which are symmetrically displaced at quadrant intervals about the borehole and in the same plane. Acoustic signals generated by the transmitter disposed at the lower end of the central tubular body member may then be utilized for cement bond logging along each of the four quadrants of the casing. Suitable control circuitry and detection circuitry such as acoustic signal arrival detection means and acoustic amplitude measurement means are provided for the operation of the above described tool in either of its configurations.

The foregoing and other objects, features and advantages of the present invention will become apparent from the following detailed description thereof when taken in conjunction with the accompanying drawings in which:

DESCRIPTION OF THE PREFERRED EMBODIMENT

Figure 1:
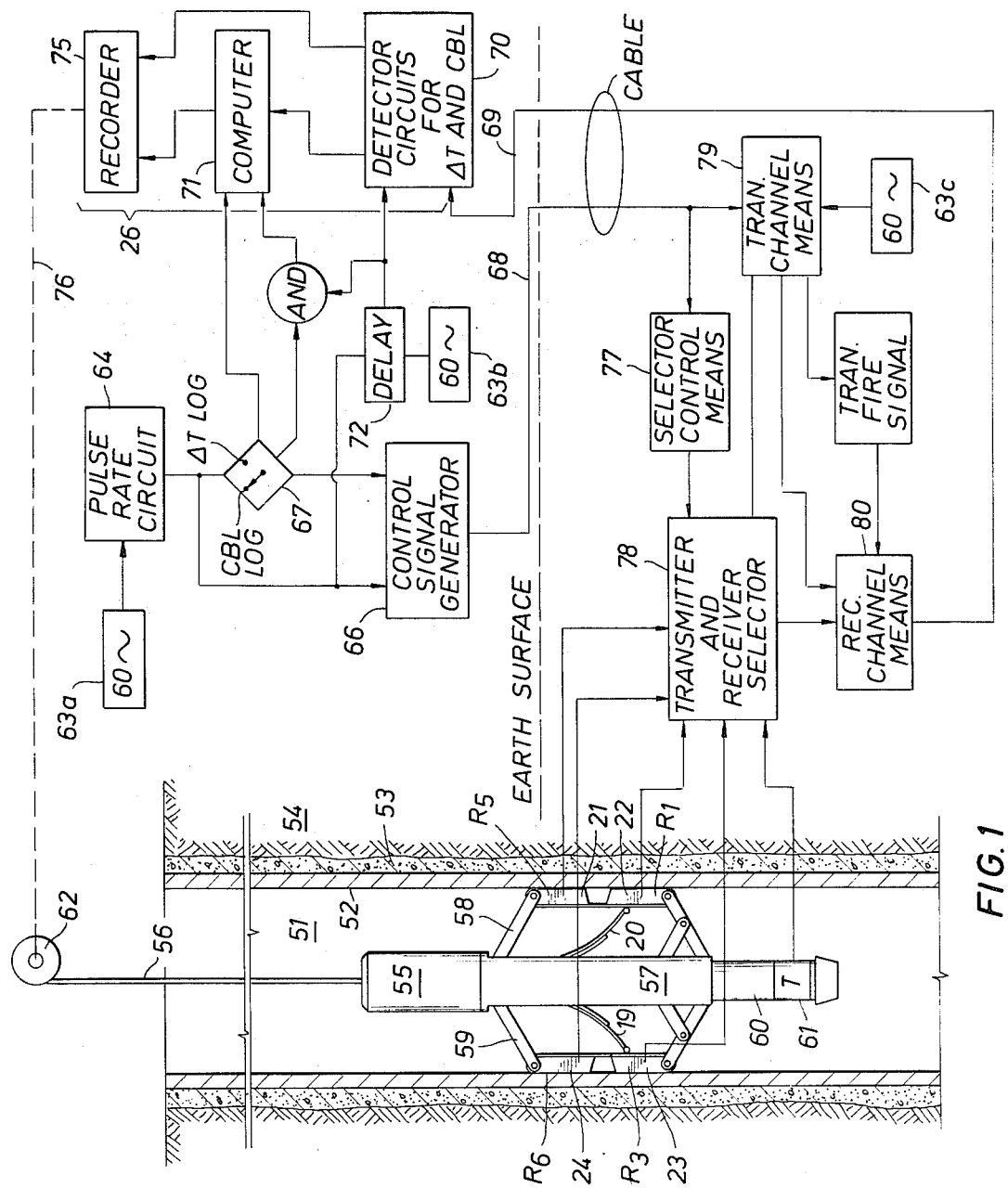
FIG. 1 is a block diagram of the logging tool of the present invention disposed in a cased borehole and showing logical disposition of the control and logging circuitry of the present invention.

Referring initially to FIG. 1, a logging sonde 57 in accordance with the principles of the present invention is shown suspended in a fluid-filled well bore 51 by an armored logging cable 56. The sonde 57 has a central tubular body member which houses the downhole electronics in its upper portion 55 and a lower extension 60 which houses an acoustic transmitting transducer 61. The central portion of the tubular body member of sonde 57 is equipped with foldable outrigger type, articulated arms 58 and 59 and a mechanism for opening and closing these arms. Although for clarity of the drawing, only two such arms 58 and 59 are shown, it will be understood that the sonde of the present invention is equipped with four such arms spaced at quadrant intervals about the exterior portion of the central tubular body member. The four quadrant spaced arms are equipped with wall engaging pad members 21, 22, 23 and 24.

Each of the pad members 21, 22, 23 and 24 contain acoustical receiving transducers which are labeled $R_1$, $R_3$, $R_5$ and $R_6$ respectively in the drawing of FIG. 1. The articulated arm members of the sonde are provided with spring means 19 and 20 which function to constantly urge the members outwardly and means are provided for retracting the members. These means include a driven member (not shown) which is movable upwardly on the body member together with means responsive to upward movement of this driven member for causing the wall engaging pad means 21, 22, 23 and 24 to move toward retracted positions. For further detail regarding the retractable articulated arm members of the sonde 57 reference may be had to a copending patent application, Ser. No. 770,978 by John Planche, which was filed Oct. 28, 1968 and which is assigned to the assignee of the present invention. The retractable arm mechanism disclosed in this copending application is contained in the central portion of the tubular body member of the sonde 57.

The sonde 57 is shown suspended in the well bore 51 by logging cable 56 which passes over a schematic pulley arrangement 62 on the surface and thence connects the sonde to the surface control circuits 26 of the present invention. These surface control circuits 26 function to provide coded command signals over the conductors of cable 56 to the downhole tool and also receive acoustical logging signals from the downhole tool which are processed by appropriate circuitry and displayed on the recorder 75. This control circuitry will be discussed in more detail subsequently.

Figure 2:
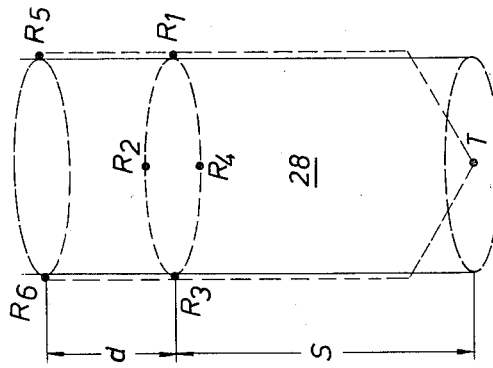
FIG. 2 is a schematic diagram illustrating the geometry of the acoustic transmitter and six acoustic receivers of the present invention.

Referring now to FIG. 2, the geometrical arrangement of the acoustical transmitting transducer and the six acoustical receiving transducers of the logging tool of the present invention are illustrated schematically. A schematic borehole 28 is used for this purpose. The transmitting transducer labeled T in the drawing of FIG. 2 is centralized in the well bore by the action of the articulated arms of the sonde 57. The receiving transducers $R_1$, $R_2$, $R_3$, $R_4$, $R_5$ and $R_6$ which are carried on the articulated arms of the sonde above the transmitting transducer are disposed adjacent the walls of the schematic borehole 28 in two planes perpendicular to the axis of the borehole. Receivers $R_1$, $R_2$, $R_3$ and $R_4$ are located in a first plane which is located a distance S above the transmitting transducer T and are spaced at quadrant intervals about the wall of the borehole in this plane. Receiving transducers $R_5$ and $R_6$ are located in a second plane suspended a distance S + d above the transmitting transducer T and are located diametrically opposite each other on the walls of schematic borehole 28. Transducers $R_1$ and $R_5$ together with $R_3$ and $R_6$ are located in the same vertical plane of schematic borehole 28. As previously discussed, this configuration may be used for either acoustic travel time logging or for cement bond logging in a cased borehole. Switching means carried in the upper portion 55 of the sonde 57 are utilized to select four of the receiving transducers for use at any one time in either of these modes of operation.

For the cement bond logging mode of operation, receivers $R_1$, $R_2$, $R_3$ and $R_4$ are selected. When the transmitting transducer T is fired, acoustic waves travel through the borehole fluid into the casing and surrounding cement and vertically upward along the casing and are received at each of the receiving transducers $R_1$, $R_2$, $R_3$ and $R_4$. The amplitude of the early arriving acoustical waves at each of these receivers can then be an indication of the bonding of the cement to the casing as discussed previously. By utilizing receivers which are held against the casing by the articulated arm and pad arrangement and spaced at quadrant intervals in the same plane around the borehole, it is possible to detect non-symmetrical irregularities in the cement. This is primarily due to the fact that because of the construction of the receiving transducers $R_1 - R_4$, that each is most sensitive to acoustical waves in a vertical plane containing it and the transmitting transducer. Such transducers are disclosed in more detail in a copending application entitled, "Acoustic Logging Apparatus For Travel Time and Cement Bond Logging" by G. J. B. Crawford, Ser. No. 60,167 filed Apr. 7, 1970 which is assigned to the assignee of the present invention. Thus, each of the receivers $R_1$, $R_2$, $R_3$ and $R_4$ when used in this mode of cement bond logging is primarily responsive to that portion of acoustic energy which has traveled only in the quadrant of the borehole in which it is disposed. This disposition provides four separate indications of cement bonding in the four quadrants of the borehole. In practice, the acoustic transmitting transducer is fired separately for each of the four early arrival amplitude measurements at the respective receiver. That is to say, a full cycle of cement bond logging measurement would involve four transmitter firings and four receiver amplitude measurements, one for each quadrant of the borehole.

When it is desired to utilize the logging tool of the present invention for acoustic travel time measurements, receivers $R_1$, $R_3$, $R_5$ and $R_6$ are selected by the switching means housed in the upper portion 55 of the sonde 57. In this mode of operation it is desired to measure the travel time of acoustic waves over the interval d of FIG. 2. This is accomplished by a firing sequence of four transmitter firings. During the first transmitter firing, the travel time to one of the receivers say $R_5$ is measured. When the transmitter is fired the second time the travel time to the receiver $R_1$ is measured. These two travel times may then be combined by subtracting the travel time from the transmitter to the receiver $R_1$ from the travel time from the transmitter to the receiver $R_5$ to give the travel time of acoustic waves between the two receivers $R_1$ and $R_5$. Similarly, two further transmitter firings can produce the travel time for acoustic waves between the receivers $R_6$ and $R_3$. By combining by subtraction the travel times from the transmitter T to the receiver $R_6$ and the travel time from the transmitter I to the receiver $R_3$, two independent measurements of the travel time of acoustic waves over the distance d may be obtained. Because of the mechanical construction and arrangement of the receivers on the articulated arms of the tool, the line joining receivers $R_1$ and $R_5$ is always maintained parallel to the line joining receivers $R_3$ and $R_6$. Averaging the two independent travel time measurements between receivers $R_1$ and $R_5$ and receivers $R_3$ and $R_6$ will thus compensate for any acoustic path length differences between the transmitter and these two receiver combinations which may be caused by the pads being tilted with respect to the walls of the borehole. Moreover, the travel tim measurements provided by the geometrical arrangement of transducers shown in FIG. 2 will not be affected by eccentricity of the transmitter in the borehole. This is the case since the portion of the acoustical path length from the transmitter to the lower of the two receivers (i.e., either $R_1$ or $R_3$) will cancel when the two travel time measurements (i.e., travel time from T to $R_6$ and T to $R_3$ or from T to $R_5$ and T to $R_1$) are combined by subtraction. Similarly, the effect of borehole wall caves or irregularities between the transmitter T and the pad mounted receivers will be minimized. The only errors which such irregularities could introduce into the measurement would be those caused by waveform distortion (i.e. unsymmetrical wave shapes introduced in the acoustic wave train arriving at the receivers) which could cause the signal detection circuitry to respond in an irregular manner to the arrival of the signal at the receivers. However, errors such as these would affect the computed travel time between transmitter T and the receiver in question by a minimal amount. If the distance d is chosen to be a convenient length, say one foot, then an average of the acoustic travel time per foot is provided which may be recorded as a travel time log of the well directly on the recorder 27.

Referring again to FIG. 1, the logging sonde of the present invention is shown suspended in a fluid-filled cased borehole. The borehole 51 has casing 52 cemented in place by a layer of cement 53 between it and the adjoining formations 54. Although not illustrated in the drawing, it will be understood that the housing portion of sonde 57 is so constructed that direct transmission of acoustic energy therethrough from the transmitter to the receiver is either suppressed to a negligible level or delayed with respect to the travel time through the formations or casing so as to not interfere with the measurements. Various types of housing construction such as open work design are known in the art for this purpose.

The tool is suspended in the well bore by means of an armored cable 56. The cable 56 may contain a plurality of conductors for providing paths for electrical signals between the surface equipment and the downhole apparatus as well as to supply electrical power from a source on the earth's surface to the downhole equipment.

The surface equipment of the system is shown generally in block form above the dotted line in FIG. 1. The master reference frequency for overall operation of the logging system is provided by an approximately 60 cycle per second power source which may be obtained from commercial power lines where available or from separate generators. Preferably, power is conducted from its source at the surface to both the surface equipment and via suitable conductors in the cable 56 to the downhole equipment, but for ease of illustration, 3 separate 60 cycle per second inputs 63a, 63b and 63c are shown in FIG. 1. As will be seen from the ensuing description the 60 cycle source provides operating power for the electronic equipment as well as providing a reference frequency.

Master timing pulses for synchronizing the various components of the system are generated by the pulse rate circuit 64. This circuit provides a train of sharp pulses whose frequency is an integral submultiple of the 60 cycle reference frequency. Thus, for example, the repetition frequency of the timing pulses generated by the circuit 64 may vary from 1/9 to ½ of the 60 cycle reference frequency. Of course, other frequencies or ratios could be used if desired. Between each pair of successive pulses generated by the rate circuit 64 an individual transmitter to receiver travel time measurement is made and the pulse frequency selected will therefore depend upon the particular type of formations expected to be encountered. A timing pulse rate that has been found suitable for a wide variety of applications is 20 pulses per second which provides a pulse period or spacing between successive timing pulses of 50 milliseconds.

The timing pulses generated in the pulse rate circuit 64 are transmitted via conductor 65 directly to a control signal generator 66. The timing pulses also serve to synchronize operation of a selector programmer 67 whose output is delivered to the control signal generator 66. The selector programmer 67 is provided with means such as a manually actuated switch arm, which enables either mode of the measurement sequence to be selected. That is, either the cement bond log mode or the acoustic travel time mode is selected by the manual switch on the programmer 67. Between each successive pair of timing pulses from the pulse rate circuit 64, the control signal generator 66 provides a control signal consisting of one to four distinct control signal pulses over conductor 68 to the downhole equipment.

Electrical signals indicative of the acoustic measurements made in the downhole equipment are transmitted to the surface over conductor 69 in the cable 56. These signals are supplied to a detecting circuit 70 which measures the acoustic travel time for acoustic travel time logging and the amplitude of the early arrivals for cement bond logging purposes. The detector circuits 70 provide an output which is correlated with the travel time measurements and which is suitable as an input to the computer 71 which performs the indicated combination operations previously discussed to arrive at the acoustic travel time measurement. The detecting circuits 70 are rendered responsive to electrical signals transmitted from the downhole equipment by timing pulses from the pulse rate circuit 64 transmitted via a fixed delay means 72. The delay means is synchronized with the 60 cycle reference frequency 63b and insures that the detecting circuit is not rendered operative until just prior to the expected arrival of a signal from the downhole equipment in order to minimize the possibility of errors resulting from spurious signals.

The particular arithmetic function to be performed by the computer 71 depends upon the particular type of measurement chosen by the selector programmer 67. Instructions are fed to the computer via conductor 73 directly from the programmer 67 and also from the output of an AND circuit 74 which is responsive to the simultaneous application of signals from the delay means 72 and the programmer 67. The instruction signals supplied to the computer 71 dictate the particular arithmetic function which it is to perform and also tell it when a particular computation has been completed and to prepare for the next computation.

The computer 71 provides an analog output signal whose amplitude is directly proportional to the particular acoustic travel time measurement taken during the measurement cycle. This signal is fed to an indicating means such as a recording galvanometer or other recorder 75 to produce a visually interpretable indication. As indicated by the dotted line 76, the record feeding means for the recorder is mechanically linked to the winch 62 for movement therewith. This provides a plot of travel time or cement bond logging condition versus the depth in the well at which the measurements were obtained.

Control signal pulses from the control signal generator 66 are conducted via the conductor 68 in the cable 56 to operate the downhole equipment shown below the dashed line in FIG. 5 and which is housed within the upper portion 55 of the logging tool. This equipment includes a selector control means 77 which interprets the received control signal pulses to select a specific receiver combination to be activated during each measurement. The actual selection is accomplished by a transmitter and receiver selector means 78 which responds to the selector control means to put in the circuit the particular receiver combination desired.

Control signal pulses from the control signal generator 66 at the surface are also supplied to a transmitter channel means 79 in the downhole equipment. The transmitter channel means 79 is synchronized with the 60 cycle master reference frequency 63c and performs a three-fold function. Firstly, the transmitter channel means 79 provides an output current pulse to activate the transmitter. This generates the acoustic energy whose travel time to the selected receiver is to be measured.

The transmitter channel means 79 also provides a blocking signal to deactivate a portion of the receiver channel means 80. Conveniently, the receiver channel means 80 comprises a multi stage amplifier provided with gating means to prevent an input signal to the first stage from reaching its output stage. The output of the transmitter channel means 79 supplies a blocking signal to the receiver channel means 80 which commences just prior to the generation of the transmitter output pulse and continues to a time just prior to the earliest possible arrival of a signal from the selected receiver. Thus, spurious signals or cross talk cannot be transmitted by the receiver channel means 80 to the surface equipment during this period. The input stage of the receiver channel means 80 is coupled by the selector means 78 to the selected receiver.

The transmitter channel means 79 also actuates, at the time the transmitter is pulsed, a transmitter fire signal circuit which generates a narrow pulse indicating the time of firing of the transmitter. The fire signal pulse is coupled to the unblocked output stage of the receiver channel means 80 and is transmitted immediately to the surface via the conductor 69.

After the input stage of the receiver channel means 80 is unblocked, electrical signals resulting from the acoustic impulses detected by the selected receiver will be amplified and transmitted to the surface of the earth via the cable conductor 69. For each measurement then, there will be supplied to the surface equipment first a marking pulse indicative of the time of firing of the transmitter, and second, an electrical signal corresponding to the impulse received at the associated receiver. It will be understood, of course, that the selected receiver in the logging tool converts the incident acoustical energy into electrical signals having wave forms representative of such acoustic energy in a conventional manner.

To illustrate the operation of the overall system, assume that is desired to make a log of the acoustic travel time borehole using the receiver combination $R_1$, $R_3$, $R_5$ and $R_6$ as illustrated in FIG. 2. As previously discussed, such a measurement necessitates the taking of four individual travel time measurements $TR_1$, $TR_5$, $TR_3$ and $TR_6$. The selector programmer 67 is set to the $\Delta T$ log position by the operator to perform the desired measurement. The logging tool is positioned in the well bore and power supplied to actuate the winch and to provide energy to the electronic circuitry.

Upon receipt of the first timing pulse from the pulse rate circuit 64 the control signal generator 66 generates a control signal representative of the $TR_5$ measurement and transmits it to the downhole apparatus. The control signal is received at the selector control means 77 which actuates the transmitter and receiver selector means 78 so that the transmitter T and receiver $R_5$ in the tool are operative. At the same time the transmitter channel means 79 is rendered operative to pulse the transmitter and to actuate the receiver channel means 80 in accordance with the previous description. Signals representative of the transmitter firing time and the received impulse are transmitted to the surface and through the detecting circuit 70 to the computer 71. All of this occurs prior to the generation of the second timing pulse rate circuit 64. The computer 71 having been instructed by the selector programmer 67 that the complete measurement cycle requires four individual travel time measurements holds the information representative of this first measurement.

The operation is repeated upon receipt by the control signal generator 66 of the second pulse from the pulse rate circuit 64 with the difference that the control signal generated is such as to set up the selector control means 77 and the transmitter receiver selector means 78 to render the transmitter T and the receiver $R_1$ operative. The resultant travel time indication is conducted to the surface computer. Similarly, the third and fourth timing pulses from the pulse rate circuit 64 set up the transmitter and receivers in the logging tool to provide the logging time measurements $TR_6$ and $TR_3$ during the third and fourth timing periods respectively.

Upon receipt of the fourth travel time measurement from the downhole equipment the computer 71 performs the arithmetic function $$\Delta T_{AVG} = (TR_5 - TR_1 + TR_6 - TR_3)/(2d)$$

to provide an output signal to the recording apparatus 75 indicative of the average acoustic travel time over the distance $d$.

At the conclusion of the fourth individual travel time measurement and performance of the arithmetic function the selector programmer in conjunction with the AND circuit 74 resets the computer and readies it for another computation sequence. Thus, the process may be repeated as the logging tool is moved through the well bore to provide acoustic travel time measurements over a desired interval of the borehole.

The circuits just discussed perform similar functions when the apparatus is used for cement bond logging with the exception that the detector circuit 70 is enabled to detect the amplitudes of the early arrival acoustic impulses for each of the four cement bond measurements and the computer 71 delays recording of each of these amplitudes until all four amplitudes at the same depth have arrived. At this time the recording apparatus receives the resultant four output amplitude signals for recordation at the same borehole depth. Further details of the above described circuitry may be had by reference to U.S. Pat. No. 3,304,537 which issued to R. J. Schwartz on Feb. 14, 1967 and is assigned to the assignee of the present invention.

Since various changes or modifications in the above described apparatus may be apparent to those skilled in the art without departing from the inventive concepts involved, it is the aim of the appended claims to cover all such changes and modifications falling within the true spirit and scope of the present invention.

I claim:

1. Apparatus for acoustically logging earth formations and cement conditions in a well bore, comprising:
   a body member sized for passage through a well bore;
   at least one acoustic transmitting transducer mounted on the body member;
   at least one movable arm carried by said body member;

pad means carried by at least one movable arm for engaging the wall of the well bore and including at least one acoustic receiving transducer;

means for extending and retracting each arm relative to the body member, said means being operative to move each pad means into engagement with the well bore wall when the corresponding arm is extended; and means for repetitively firing said transmitting transducer to transmit acoustic energy impulses into the media surrounding the well bore.

2. The apparatus of claim 1 wherein four such movable arms are carried by the body member, transducer-including pad means is carried by each movable arm, and the arms are spaced at quadrant intervals about the circumference of said body member.

3. The apparatus of claim 1 and further including means for detecting the arrival of transmitted acoustic energy at each of said acoustic receiving transducers and for generating signals representative of the elapsed time between said transmitter firing and said arrival.

4. The apparatus of claim 1 further including means for measuring the amplitude of early arrival acoustic energy at each of said receiving transducers and generating signals representative thereof.

5. The apparatus of claim 4 further including means for recording said representative signals from each of said receiving transducers independently as a function of depth of the tool in a well bore.

6. A method of acoustically logging earth formations and cement conditions in a well bore employing a well tool having a body member of substantially smaller horizontal cross-sectional size than the well bore, comprising:

positioning the body member within the well bore such that it stands off from the well bore wall;

positioning at least one acoustic receiving transducer, retractably supported outward of the body member, closely adjacent the wall of the well bore;

transmitting pulses of acoustic energy into the media surrounding the well bore by repetitively firing an acoustic transmitting transducer mounted on the body member;

generating by at least the one receiving transducer electrical signals in response to acoustic energy received thereat from the surrounding media; and recording representations of the generated electrical signals as a function of the depth of the well tool in the well bore.

7. The method of claim 6 wherein four acoustic receiving transducers spaced at quadrant intervals about the well tool circumference are positioned closely adjacent the well bore wall, and electrical signals are independently generated by each receiving transducer in response to acoustic impulses arriving thereat through the adjacent quadrant portion of the media surrounding the well bore.

8. The method of claim 7 wherein the representations recorded are representative of the amplitudes of the early arrivals of acoustic energy at each receiving transducer, thereby to provide indications of cement conditions in a cased well bore.

9. The method of claim 6 wherein two pairs of longitudinally spaced acoustic receiving transducers, one pair being disposed diametrically opposite the other relative to the body member, are positioned closely adjacent the wall of the well bore; and electrical signals are independently generated by each receiving transducer that are representative of the elapsed time between the firing of the transmitting transducer and the arrival at each receiving transducer of acoustic energy.

10. The method of claim 9 wherein the independently generated signals are combined arithmetically to produce a representation indicative of the average travel time of acoustic energy between the longitudinally spaced receivers of the receiver pairs; and the average travel time representation is recorded as a function of the depth of the well tool in the well bore.

11. The apparatus of claim 1 wherein at least one pad means includes at least two longitudinally spaced receiving transducers.

12. The apparatus of claim 1 wherein:

a plurality of said movable arms are mounted on the body member in spaced relation about the circumference thereof, and transducer - including pad means is carried by each movable arm.

13. The apparatus of claim 12 wherein:

at least two of said movable arms are located on diametrically opposite sides of said body member; and the pad means carried by each of said diametrically opposed arms includes at least two longitudinally spaced acoustic receiving transducers.

14. The apparatus of claim 3 further including means for recording representations of said electrical signals from each receiving transducer independently as a function of the depth of the tool in the well bore.

15. The method of claim 6 wherein a plurality of acoustic receiving transducers, each retractably supported outward of the body member, are positioned closely adjacent the well bore wall in spaced relation about the circumference of the well tool;

each receiving transducer is independently energized to generate electrical signals in response to acoustic energy impulses arriving thereat through the adjacent portion of the media surrounding the well bore; and representations of the independently generated signals are recorded as a function of the depth of the well tool in the well bore.

16. The method of claim 6 wherein:

at least one pair of longitudinally spaced acoustic receiving transducers are positioned closely adjacent a portion of the well bore wall; and each of the pair of receiving transducers is independently energized to generate electrical signals in response to the arrival thereat of acoustic energy through the media surrounding the well bore, the respective signals being representative of the elapsed time between firing of the transmitting transducer and the arrival of acoustic energy at each receiving transducer.

17. The method of claim 16 wherein the representations recorded are representative of the travel time of acoustic energy between the longitudinally spaced receiving transducers of at least the one pair of transducers.

* * * * *

PO-1050
(5/69)

21393

UNITED STATES PATENT OFFICE
CERTIFICATE OF CORRECTION

Patent No. 3,691,518      Dated September 12, 1972

Inventor(s) Nick A. Schuster

It is certified that error appears in the above-identified patent and that said Letters Patent are hereby corrected as shown below:

Column 6, line 26, "I" should read --T--;

line 39, "tim" should read --time--;

Column 7, line 37, "traIn" should read --train--;

line 51, the bold face "20" should be normal type --20--;

Column 10, line 61 (Claim 1, line 2), "and" should be --or--;

Column 11, line 1, "by at least one" should read --by said at least one--;

line 4, "means for extending and retracting each arm" should read --means for extending and retracting said at least one pad means-carrying arm--;

line 6, "each" should read --said--;

line 17 (Claim 3, line 1), "and" should be deleted;

Signed and sealed this 15th day of May 1973.

(SEAL)
Attest:

EDWARD M. FLETCHER, JR.
Attesting Officer

ROBERT GOTTSCHALK
Commissioner of Patents

UNITED STATES PATENT OFFICE
CERTIFICATE OF CORRECTION

Patent No. 3,691,518　　　　　　　　　　Dated September 12, 1972

Inventor(s)　　Nick A. Schuster

It is certified that error appears in the above-identified patent and that said Letters Patent are hereby corrected as shown below:

Column 6, line 26, "I" should read --T--;

line 39, "tim" should read --time--;

Column 7, line 37, "traIn" should read --train--;

line 51, the bold face "20" should be normal type --20--

Column 10, line 61 (Claim 1, line 2), "and" should be --or--;

Column 11, line 1, "by at least one" should read --by said at least one--;

line 4, "means for extending and retracting each arm" should read --means for extending and retracting said at least one pad means-carrying arm--;

line 6, "each" should read --said--;

line 17 (Claim 3, line 1), "and" should be deleted;

Column 11, line 31, "and" should read -- or --.

This certificate supersedes Certificate of Correction issued May 15, 1973.
　　　Signed and sealed this 3rd day of July 1973.

(SEAL)
Attest:

EDWARD M. FLETCHER, JR.　　　　　Rene Tegtmeyer
Attesting Officer　　　　　　　　Acting Commissioner of Patents